United States Patent [19]

Driscoll et al.

[11] Patent Number: 4,714,600

[45] Date of Patent: Dec. 22, 1987

[54] PROCESS FOR PRODUCTION OF PHOSPHORIC ACID FROM DRY MATRIX BY SO$_3$ TREATMENT AND EXTRACTION

[75] Inventors: Patrick R. Driscoll, Spotswood; Ross A. Kremer, Ringoes, both of N.J.

[73] Assignee: Mobil Oil Corporation, New York, N.Y.

[21] Appl. No.: 685,509

[22] Filed: Dec. 24, 1984

[51] Int. Cl.$^4$ .............................................. C01B 25/16
[52] U.S. Cl. .................................... 423/319; 423/320; 423/321 S
[58] Field of Search ............... 423/316, 317, 319, 320, 423/321 R, 321 S, 167, 166

[56] References Cited

U.S. PATENT DOCUMENTS

| | | | |
|---|---|---|---|
| 1,251,741 | 1/1918 | Blumenberg | 423/167 |
| 3,391,996 | 7/1968 | Van Dijk et al. | 423/167 |
| 3,410,654 | 11/1968 | Wiesboeck et al. | 423/321 S |
| 3,886,259 | 5/1975 | Nikolai et al. | 423/167 |
| 4,154,800 | 5/1979 | Cannon et al. | 423/167 |
| 4,501,724 | 2/1985 | Goers | 423/320 |

FOREIGN PATENT DOCUMENTS

| | | | |
|---|---|---|---|
| 2662 | of 1887 | United Kingdom | 423/320 |
| 1426509 | 2/1976 | United Kingdom | 423/319 |

OTHER PUBLICATIONS

Ross, Reactions of Sulfur Oxides with Phosphate Rock, 1966, pp. 29, 30.

*Primary Examiner*—Gregory A. Heller
*Attorney, Agent, or Firm*—Alexander J. McKillop; Michael G. Gilman; Edward J. Trojnar

[57] ABSTRACT

Phosphoric acid is produced from dry phosphate ore, matrix by acidulation with sulfur trioxide in the presence of sulfuric acid catalyst to form polyphosphoric acid, treatment with sufficient water to convert the polyphosphoric acid to orthophosphoric acid and extraction with water or organic solvent such as a lower alcohol, particularly methanol or ethanol.

6 Claims, No Drawings

PROCESS FOR PRODUCTION OF PHOSPHORIC ACID FROM DRY MATRIX BY SO₃ TREATMENT AND EXTRACTION

BACKGROUND OF THE INVENTION

Phosphate ore is sometimes treated with sufficient sulfuric acid to make phosphates available as a plant or animal nutrient without separating the calcium sulfate formed. Alternatively, in the wet acid process, acidulation with sulfuric acid can be complete to yield phosphoric acid which is separated from the calcium sulfate residue for use as a fertilizer and for other common uses of phosphoric acid.

High quality phosphoric acid is produced by the reaction of calcium phosphate raw materials with silica and carbon in an electric arc furnace to produce elemental phosphorous, which is then burned, and the phosphorous oxides formed absorbed with water to produce high-quality phosphoric acid.

The so-called wet process, in which phosphoric acid is made by contacting insoluble phosphates with dilute sulfuric acid, is very expensive because of the corrosiveness of the dilute acids used, the intricate stages and recycles necessary for proper crystal growth to facilitate the separation of the phosphoric acid from the calcium sulfate residue, and the necessity of evaporating large amounts of excess water from the phosphoric acid product to handle and ship economically.

Phosphoric acid made via the elemental phosphorous route has an even higher cost of manufacture due to the electrical energy consumed and the very high temperature furnace equipment needed, so that the product is primarily used only as a food ingredient.

A method of treating calcined phosphate ore with sulfur dioxide to convert the insoluble phosphate to increase the content of soluble phosphates is described in U.S. Pat. No. 3,544,300 which is incorporated herein by reference in entirety. In the patent the sulfur dioxide is removed from the treated ore which is used as such as a fertilizer without any step of extraction of phosphoric acid.

A method of producing phosphoric acid by treatment of phosphate ore with sulfur acid or sulfur trioxide and extraction of the phosphoric acid with water is described in U.S. Pat. No. 4,154,800 which is incorporated herein by reference.

SUMMARY OF THE INVENTION

Phosphoric acid is produced from phosphate ore matrix by:
(A) drying the phosphate ore matrix;
(B) acidulating the dry matrix with sulfur trioxide in the presence of sulfuric acid catalyst;
(C) removing the excess sulfur trioxide from the matrix;
(D) treating the acidulated matrix with sufficient water to convert phosphorus values to orthophosphoric acid; and
(E) extracting the orthophosphoric acid with a solvent in which it is soluble.

DETAILED DESCRIPTION OF THE INVENTION

The improved process of preparing phosphoric acid from insoluble calcium phosphate containing ores in accordance with this invention involves treatment of the dry ground ore matrix with sulfur trioxide and sulfuric acid catalyst. The phosphate ore is dried preferably at temperatures of up to about 500° C., and finely ground to particle size which is preferably at least −50 mesh.

The dried, ground, matrix is acidulated with excess liquid sulfur trioxide at temperatures which can vary widely but which are preferably in the range of 30° to 45° C. Reaction can be conducted at atmospheric pressure and typically a reaction time of 3 hours will suffice.

It is an important aspect of this invention that sulfuric acid be present in catalytic quantities during the reaction between the phosphate or matrix and the liquid sulfur trioxide. Catalytic quantities are considered to be less than the stoichiometric amount of sulfuric acid required to acidulate all the phosphate in the matrix, preferably less than 25% of the stoichoimetric amounts. The sulfuric acid catalyst can be predissolved in the liquid sulfur trioxide or can be formed in-situ by reaction of the sulfur trioxide with residual water in the dry matrix. The presence of the sulfuric acid results in a significantly faster reaction, and a higher conversion to phosphoric acids.

The sulfur trioxide is present in a stoichiometric excess of the dry matrix. Preferably the weight ratio of sulfur trioxide to dry matrix is 2:1 to 5:1.

After reaction of the dry matrix by slurrying the matrix in the liquid sulfur trioxide containing catalytic sulfuric acid, the unreacted sulfur trioxide is separated from the acidulated matrix. Separation is preferably conducted by simple distillation which can be conducted at atmospheric pressure. It is preferred that distillation can be conducted at temperatures not in excess of about 100° C. and most preferably below about 85° C. The recovered sulfur trioxide can be recycled for reuse in the acidulation step.

The acidulated sulfur trioxide-free matrix is treated with sufficient water to convert the phosphoric acids formed in the acidulation reaction to orthophosphoric acid. Preferably, water as vapor in ambient or humidified air is used.

The phosphoric acid is recovered by leaching the acidulated, hydrated, solid product with a solvent for the phosphoric acid. Preferably, water or a lower alcohol containing one to five carbon atoms, particularly methyl alcohol or ethyl alcohol, is used. The water vapor treatment step can be eliminated if water is used as the leaching solvent. The solvent containing the orthophosphoric acid product is then distilled to remove the leaching solvent which can be recycled, and the orthophosphoric acid is recovered as a bottoms product.

The invention is illustrated by the following non-limiting example.

EXAMPLE 1

A sample of Florida matrix having a phosphorus content of 40% BPL is ground to 100% −50 mesh and dried at 300° C. The dried, ground matrix is acidulated for 3.0 hours at 35°–45° C. with liquid sulfur trioxide to which 2.3 wt% of 96% sulfuric acid catalyst/promoter was previously added, using a weight ratio of 2.2 weights acidulating agent to 1.0 weight dry, ground matrix. The excess sulfur trioxide is then removed by distillation at a temperature of 80° C. or below. The acidulated matrix is then extracted with room temperature water and filtered. 91.4% of the phosphorus value in the matrix is recovered in the filtrate.

EXAMPLE 2

A sample of the same matrix used in Example 1 was ground to 100% −50 mesh and dried at 110° C. The dried, ground matrix is acidulated for 3.0 hours at 35°-45° C. with liquid sulfur trioxide to which 1.3% of 96% sulfuric acid catalyst/promoter was previously added, using a weight ratio of 4.3 weights acidulating agent to 1.0 weights dry, ground matrix. The excess sulfur trioxide is then removed by distillation at a temperature of 85° C. or below. Water is then added to the acidulated matrix and removed by distillation to gain 3.0% weight increase (based on dry matrix charged) and hydrate polyphosphoric acids. The acidulated/hydrated matrix is then extracted with room temperature methanol and filtered. 97.0% of the phosphorus value in the matrix is recovered in the filtrate.

EXAMPLE 3

A sample of the same matrix used in Examples 1 and 2 is ground to 100%−50 mesh and dried at 300° C. The dried, ground matrix is acidulated for 3.0 hours at 35°-45° C. with liquid sulfur trioxide containing no sulfuric acid catalyst/promoter, using a weight ratio of 5.0 weights sulfur trioxide per weight dry, ground matrix. The excess sulfur trioxide is then removed by distillation at a temperature 80° C. or below. The acidulated matrix is then extracted with room temperature water and filtered. Only 29.1% of the phosphorus value in the matrix is recovered in the filtrate.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. A process for producing phosphoric acid from phosphate ore matrix comprising:
   (A) drying the phosphate ore matrix;
   (B) acidulating the dry matrix with sulfur trioxide in the presence of sulfuric acid catalyst;
   (C) removing said sulfur trioxide from the matrix;
   (D) treating the acidulated matrix with sufficient water to convert phosphorus values to orthophosphoric acid; and
   (E) extracting the orthophosphoric acid with methanol or ethanol.

2. The process of claim 1 in which the sulfuric acid catalyst in step (B) comprises less than 25% of the stoichiometric amount necessary to acidulate all of the phosphate in the phosphate ore matrix.

3. The process of claim 1 in which the weight ratio of sulfur trioxide to dry phosphate ore matrix is 2:1 to 5:1.

4. The process of claim 1 in which said sulfur trioxide in step (C) is removed by distillation below about 80° C.

5. The process of claim 4 in which the sulfur trioxide which is removed in step (C) is recycled to step (B).

6. The process of claim 1 in which the water treatment step (D) is conducted with water vapor.

* * * * *